United States Patent
Budampati et al.

(10) Patent No.: US 8,280,057 B2
(45) Date of Patent: Oct. 2, 2012

(54) METHOD AND APPARATUS FOR PROVIDING SECURITY IN WIRELESS COMMUNICATION NETWORKS

(75) Inventors: Ramakrishna S. Budampati, Maple Grove, MN (US); Soumitri N. Kolavennu, Minneapolis, MN (US); Denis Foo Kune, Saint Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 936 days.

(21) Appl. No.: 12/020,180

(22) Filed: Jan. 25, 2008

(65) Prior Publication Data
US 2009/0060192 A1 Mar. 5, 2009

Related U.S. Application Data

(60) Provisional application No. 60/967,342, filed on Sep. 4, 2007.

(51) Int. Cl.
*H04K 1/00* (2006.01)
(52) U.S. Cl. ........ 380/270; 713/182; 713/193; 713/170; 726/2; 726/4; 726/27; 380/37; 709/201; 709/203
(58) Field of Classification Search .............. 713/171, 713/153, 182–193, 170; 380/277, 270, 37; 709/203–206; 726/2–4
See application file for complete search history.

(56) References Cited

U.S. PATENT DOCUMENTS

| | | | |
|---|---|---|---|
| 5,371,794 A * | 12/1994 | Diffie et al. | 713/156 |
| 5,749,053 A | 5/1998 | Kusaki et al. | |
| 6,192,232 B1 | 2/2001 | Iseyama | |
| 6,256,297 B1 | 7/2001 | Haferbeck et al. | |
| 6,427,071 B1 | 7/2002 | Adams et al. | |
| 6,631,416 B2 | 10/2003 | Bendinelli et al. | |
| 6,850,486 B2 | 2/2005 | Saleh et al. | |
| 6,917,584 B2 | 7/2005 | Kuwabara | |
| 7,016,499 B2 * | 3/2006 | Perlman | 380/281 |
| 7,240,366 B2 * | 7/2007 | Buch et al. | 726/14 |

(Continued)

FOREIGN PATENT DOCUMENTS
EP 1 081 895 A1 3/2001
(Continued)

OTHER PUBLICATIONS

A Mahimkar, SecureDAV: a secure data aggregation and verification protocol for sensor networks, Nov. 29, 2004, vol. 4, pp. 2-4.*

(Continued)

*Primary Examiner* — Nathan Flynn
*Assistant Examiner* — Viral Lakhia

(57) ABSTRACT

A method includes receiving data at a first wireless node in a wireless network, where the data is associated with an industrial control and automation system. The method also includes decrypting the received data using a first encryption key to produce decrypted data and encrypting the decrypted data using a second encryption key to produce encrypted data. The method further includes communicating the encrypted data to at least a second wireless node in the wireless network. Another method includes generating first data at a first wireless node in a wireless network, where the data is associated with an industrial control and automation system. The other method also includes encrypting the first data using an encryption key and transmitting the first data to multiple second wireless nodes in the wireless network, where the second wireless nodes are capable of using the same encryption key to decrypt the first data.

21 Claims, 6 Drawing Sheets

U.S. PATENT DOCUMENTS

| | | | | |
|---|---|---|---|---|
| 7,275,157 | B2 | 9/2007 | Cam Winget | |
| 7,472,269 | B2* | 12/2008 | Perkins et al. | 713/155 |
| 7,486,651 | B2* | 2/2009 | Hagiwara et al. | 370/338 |
| 7,526,644 | B2 | 4/2009 | Kocher | 713/158 |
| 7,546,456 | B2* | 6/2009 | Le et al. | 713/162 |
| 7,860,485 | B2* | 12/2010 | Moore et al. | 455/410 |
| 7,933,410 | B2* | 4/2011 | Fahrny | 380/201 |
| 8,055,910 | B2* | 11/2011 | Kocher et al. | 713/193 |
| 2002/0146127 | A1* | 10/2002 | Wong | 380/270 |
| 2002/0174366 | A1* | 11/2002 | Peterka et al. | 713/201 |
| 2003/0005149 | A1 | 1/2003 | Haas et al. | |
| 2003/0151513 | A1* | 8/2003 | Herrmann et al. | 340/573.1 |
| 2004/0247126 | A1* | 12/2004 | McClellan | 380/262 |
| 2005/0177751 | A1* | 8/2005 | Chmora et al. | 713/201 |
| 2005/0201349 | A1 | 9/2005 | Budampati | |
| 2005/0254653 | A1 | 11/2005 | Potashnik et al. | |
| 2005/0281215 | A1 | 12/2005 | Budampati et al. | |
| 2006/0002368 | A1 | 1/2006 | Budampati et al. | |
| 2006/0045267 | A1* | 3/2006 | Moore et al. | 380/247 |
| 2006/0083200 | A1 | 4/2006 | Emeott et al. | |
| 2006/0116170 | A1* | 6/2006 | Brahmbhatt et al. | 455/560 |
| 2006/0140411 | A1* | 6/2006 | Zhu | 380/277 |
| 2006/0171344 | A1 | 8/2006 | Subramanian et al. | |
| 2006/0171346 | A1 | 8/2006 | Kolavennu et al. | |
| 2006/0211447 | A1* | 9/2006 | Purkayastha et al. | 455/552.1 |
| 2006/0227729 | A1 | 10/2006 | Budampati et al. | |
| 2006/0253703 | A1* | 11/2006 | Eronen et al. | 713/156 |
| 2006/0274644 | A1 | 12/2006 | Budampati et al. | |
| 2006/0274671 | A1 | 12/2006 | Budampati et al. | |
| 2006/0285529 | A1* | 12/2006 | Hares et al. | 370/338 |
| 2006/0287001 | A1 | 12/2006 | Budampati et al. | |
| 2007/0030816 | A1 | 2/2007 | Kolavennu | |
| 2007/0030832 | A1 | 2/2007 | Gonia et al. | |
| 2007/0076638 | A1 | 4/2007 | Kore et al. | |
| 2007/0077941 | A1 | 4/2007 | Gonia et al. | |
| 2007/0081824 | A1 | 4/2007 | Chiu et al. | |
| 2007/0087763 | A1 | 4/2007 | Budampati et al. | |
| 2007/0091825 | A1 | 4/2007 | Budampati et al. | |
| 2007/0097904 | A1* | 5/2007 | Mukherjee et al. | 370/328 |
| 2007/0153677 | A1 | 7/2007 | McLaughlin et al. | |
| 2007/0155423 | A1 | 7/2007 | Carmody et al. | |
| 2008/0031155 | A1* | 2/2008 | Korus et al. | 370/254 |
| 2008/0063204 | A1* | 3/2008 | Braskich et al. | 380/270 |
| 2008/0085004 | A1* | 4/2008 | Kitaj et al. | 380/281 |
| 2008/0186202 | A1* | 8/2008 | Vaswani et al. | 340/870.03 |
| 2008/0226073 | A1* | 9/2008 | Hawkes et al. | 380/270 |
| 2008/0263647 | A1* | 10/2008 | Barnett et al. | 726/6 |
| 2008/0273547 | A1 | 11/2008 | Phinney | |
| 2008/0292105 | A1* | 11/2008 | Wan et al. | 380/282 |
| 2009/0265550 | A1* | 10/2009 | Bahr et al. | 713/168 |

FOREIGN PATENT DOCUMENTS

| | | |
|---|---|---|
| EP | 1 439 667 A2 | 7/2004 |
| EP | 1 545 074 A1 | 6/2005 |
| WO | WO 2005/010214 A2 | 2/2005 |
| WO | WO 2005/010214 A3 | 2/2005 |
| WO | WO 2006/003532 A1 | 1/2006 |

OTHER PUBLICATIONS

"XYR 5000 Wireless Transmitters-Honeywell Solutions for Wireless Data Acquisition and Monitoring", Honeywell, Feb. 2006, 6 pages.

Dr. Soumitri Kolavennu, Presentation, "WNSIA MAC Layer", ISA SP100 meeting, Feb. 14, 2007, 24 pages, see esp. p.17.

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Frederick Hidle, "System and Method for Providing Secure Network Communications", U.S. Appl. No. 11/981,213, filed Oct. 30, 2007.

Ramakrishna S. Budampati, et al., "System and Method for Providing Simultaneous Connectivity Between Devices in an Industrial Control and Automation or Other System", U.S. Appl. No. 11/981,212, filed Oct. 30, 2007.

"IP/MPLS-Based VPNS, Layer-3 vs. Layer-2", Foundry Networks, 2002, 16 pages.

Arvinderpal S. Wandert, et al., "Energy Analysis of Public-Key Cryptography for Wireless Sensor Networks", Proceedings of the 3rd IEEE Int'l. Conf. on Pervasive Computing and Communications (PerCom 2005), 2005 IEEE, 5 pages.

European Search Report dated Aug. 24, 2009 in connection with European Patent Application No. 08163537.7.

Partial European Search Report dated Apr. 28, 2009 in connection with European Patent Application No. 08163537.7.

Communication pursuant to Article 94(3) EPC dated Oct. 28, 2009 in connection with European Patent Application No. 08163537.7.

Office Action dated Dec. 17, 2010 in connection with European Patent Application No. 08163537.7.

* cited by examiner

METHOD AND APPARATUS FOR PROVIDING SECURITY IN WIRELESS COMMUNICATION NETWORKS

CROSS-REFERENCE TO RELATED APPLICATIONS

This application claims priority under 35 U.S.C. §119(e) to U.S. Provisional Patent Application No. 60/967,342 filed on Sep. 4, 2007, which is hereby incorporated by reference.

TECHNICAL FIELD

This disclosure relates generally to communication networks and more specifically to a method and apparatus for providing security in wireless communication networks.

BACKGROUND

Many buildings, facilities, and other structures include secure communication networks, which are used for wireless and other types of communications. For example, chemical plants and other industrial facilities often include wireless networks, which can be used for a wide variety of purposes. As particular examples, the wireless networks in industrial facilities could be used to transport data to and from process controllers, process sensors, and process actuators. The wireless networks could also facilitate wireless communications between personnel working in the industrial facilities.

In order to prevent malicious or other unauthorized intrusions into a wireless network, various forms of security are typically employed in the wireless network. A common security mechanism includes the use of encryption keys to encrypt and decrypt data that is transmitted wirelessly.

SUMMARY

This disclosure provides a method and apparatus for providing security in wireless communication networks.

In a first embodiment, a method includes receiving data at a first wireless node in a wireless network, where the data is associated with an industrial control and automation system. The method also includes decrypting the received data using a first encryption key to produce decrypted data. The method further includes encrypting the decrypted data using a second encryption key to produce encrypted data. In addition, the method includes communicating the encrypted data to at least a second wireless node in the wireless network.

In particular embodiments, receiving the data includes receiving the data from a third wireless node in the wireless network. The first encryption key is uniquely associated with the first wireless node-third wireless node pair, and the second encryption key is uniquely associated with the first wireless node-second wireless node pair.

In other particular embodiments, the method also includes verifying a digital signature at the first wireless node, where the digital signature is associated with a trust authority and provided by the second wireless node. The method further includes exchanging encryption keys with the second wireless node, where the exchanged encryption keys include the second encryption key. The first wireless node could exchange encryption keys with any wireless node having (i) an active link with the first wireless node and (ii) a certificate signed by the trust authority.

In yet other particular embodiments, decrypting the received data and encrypting the decrypted data are performed at a Medium Access Control (MAC) layer and/or a network layer in the first wireless node.

In still other particular embodiments, receiving the data includes receiving the data from a leaf node in the wireless network, the leaf node communicates the data to the first wireless node and at least one other wireless node, and the first wireless node and the at least one other wireless node use the same first encryption key to produce the decrypted data. In other particular embodiments, the second wireless node includes a leaf node, the leaf node receives the encrypted data from the first wireless node and at least one other wireless node, and the first wireless node and the at least one other wireless node use the same second encryption key to produce the encrypted data.

In additional particular embodiments, the data is associated with a sensor and/or an actuator in the industrial control and automation system.

In a second embodiment, a wireless node in a wireless network includes at least one transceiver configured to receive data over the wireless network, where the data is associated with an industrial control and automation system. The wireless node also includes at least one controller configured to decrypt the received data using a first encryption key to produce decrypted data, encrypt the decrypted data using a second encryption key to produce encrypted data, and provide the encrypted data to the at least one transceiver for communication to at least a second wireless node in the wireless network.

In a third embodiment, a method includes generating first data at a first wireless node in a wireless network, where the data is associated with an industrial control and automation system. The method also includes encrypting the first data using an encryption key. In addition, the method includes transmitting the first data to multiple second wireless nodes in the wireless network, where the second wireless nodes are capable of using the same encryption key to decrypt the first data.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
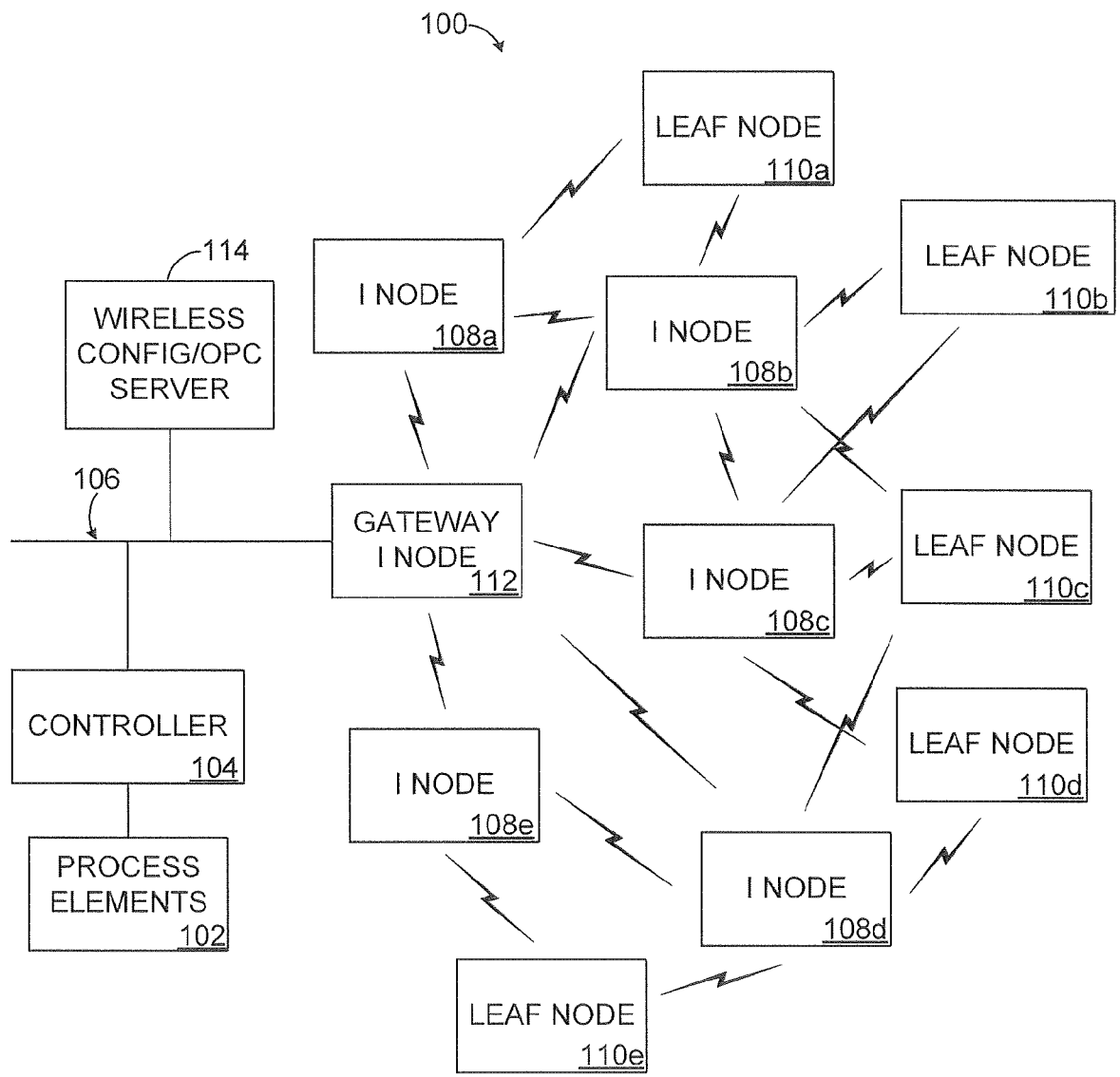
FIG. 1 illustrates an example industrial control and automation system according to this disclosure.

FIG. 1 illustrates an example industrial control and automation system 100 according to this disclosure. The embodiment of the industrial control and automation system 100 shown in FIG. 1 is for illustration only. Other embodiments of the industrial control and automation system 100 could be used without departing from the scope of this disclosure.

In this example embodiment, the industrial control and automation system 100 includes one or more process elements 102. The process elements 102 represent components in a process or production system that may perform any of a wide variety of functions. For example, the process elements 102 could represent sensors, actuators, or any other or additional industrial equipment in a processing environment. Each of the process elements 102 includes any suitable structure for performing one or more functions in a processing or production system. Also, the phrase "industrial control and automation system" generally refers to a system that automates and controls at least one process.

A controller 104 is coupled to the process elements 102. The controller 104 controls the operation of one or more of the process elements 102. For example, the controller 104 could receive information associated with the system 100, such as by receiving sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations.

As shown in FIG. 1, the industrial control and automation system 100 also includes one or more wireless networks for communicating with wireless sensors or other wireless devices. In this example, a wireless network (such as a mesh network) is formed using infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the gateway infrastructure node 112) and wirelessly communicate the data to the leaf nodes 110a-110e. Similarly, the leaf nodes 110a-110e may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the nodes 108a-108e and 110a-110e form a wireless network capable of providing wireless coverage to a specified area, such as in a large industrial complex.

In this example, the nodes 108a-108e and 110a-110e are divided into infrastructure nodes and leaf nodes. The infrastructure nodes 108a-108e typically represent line-powered devices, meaning these nodes receive operating power from an external source. As a result, these nodes 108a-108e are typically not limited in their operations since they need not minimize power consumption to increase the operational life of their internal power supplies. On the other hand, the leaf nodes 110a-110e typically represent battery-powered devices, meaning these nodes receive operating power from internal batteries or other power supplies. Because of this, these nodes 110a-110e are often more limited in their operations in order to help preserve the operational life of their internal power supplies.

Each of the nodes 108a-108e and 110a-110e includes any suitable structure facilitating wireless communications, such as an RF transceiver. Each of the nodes 108a-108e and 110a-110e could also include other functionality, such as functionality for generating or using data communicated over the wireless network. For example, the leaf nodes 110a-110e could represent wireless sensors in an industrial facility, where the sensors are used to measure various characteristics within the facility. These sensors could collect sensor readings and communicate the sensor readings to the controller 104 via the gateway infrastructure node 112. The leaf nodes 110a-110e could also represent actuators that can receive control signals from the controller 104 and adjust the operation of the industrial facility. In this way, the leaf nodes 110a-110e may include or operate in a similar manner as the process elements 102 that are physically connected to the controller 104. The leaf nodes 110a-110e could further represent handheld user devices (such as INTELATRAC devices from HONEYWELL INTERNATIONAL INC.), mobile stations, programmable logic controllers (PLCs), or any other or additional devices.

In particular embodiments, the leaf nodes 110a-110e can include 802.15.4-based low data-rate sensors and 802.11-based high data-rate devices, and the various nodes in FIG. 1 form a mesh network communicating at 2.4 GHz or 5.8 GHz. Also, in particular embodiments, data can be injected into the wireless mesh network through the infrastructure nodes, thus providing versatile, multifunctional, plant-wide coverage for wireless sensing, asset location tracking, personnel tracking, wireless communications, and any other or additional functionality as desired.

The gateway infrastructure node 112 communicates wirelessly with, transmits data to, and receives data from one or more infrastructure nodes 108a-108e and possibly one or more leaf nodes 110a-110e. The gateway infrastructure node 112 also converts data between the protocol(s) used by the network 106 and the protocol(s) used by the nodes 108a-108e and 110a-110e. For example, the gateway infrastructure node 112 could convert Ethernet-formatted data (transported over the network 106) into a wireless protocol format (such as an IEEE 802.11a, 802.11b, 802.11g, 802.11n, 802.15.3, 802.15.4, or 802.16 protocol format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In this example, a wireless configuration and OLE for Process Control (OPC) server 114 can be used to configure and control various aspects of the process control system 100. For example, the server 114 could be used to configure the operation of the infrastructure nodes 108a-108e and the gateway node 112. The server 114 could also be used to support security in the industrial control and automation system 100. For instance, the server 114 could distribute cryptographic keys or other security data to various components in the industrial control and automation system 100, such as to the nodes 108a-108e, 110a-110e, and 112. The server 114 includes any hardware, software, firmware, or combination thereof for configuring wireless networks and providing security information.

In one aspect of operation, the nodes 108a-108e, 110a-110e, 112 in the wireless network transmit data that is protected using encryption keys, which are used to encrypt and decrypt the data. The encryption used in the wireless network or in the system 100 in general may represent an "end-to-end" security mechanism, meaning the data is transmitted in encrypted form from a source and arrives in encrypted form at one or more destinations (whether the data traverses one or multiple paths to the destinations). The actual security mechanism used in the system 100 could vary according to particular needs. For example, in some embodiments, the end-to-end security could be used only within the wireless network, meaning data can be encrypted during all wireless transmissions (but the data need not be encrypted when transmitted over a wired network). The end-to-end security could also be used throughout the system 100 or in larger portions of the system 100, where data can be encrypted during wired or wireless transmissions.

Conventional wireless networks, such as those used for industrial wireless applications, use a single encryption key for the entire wireless network. This approach has inherent security problems since, for example, a compromised node in the network can compromise communications throughout the entire network.

In accordance with this disclosure, different encryption keys can be used for communications between nodes in the system 100. For example, the infrastructure nodes 108a-108e, 112 could communicate using different encryption keys. In some embodiments, for instance, each pair of infrastructure nodes may communicate using an encryption key unique to that pair. In these embodiments, each infrastructure node in the pair can transmit data to and receive data from the other infrastructure node in the pair using that encryption key. In other embodiments, each infrastructure node may transmit data to and receive data from one or multiple neighboring nodes using its own encryption key. "Neighboring nodes" of a particular infrastructure node could represent other nodes that are in direct contact with the particular infrastructure node or other nodes that maintain an active link with the particular infrastructure node. As a particular example, the infrastructure node 108e in FIG. 1 is in direct communication with infrastructure node 108d and gateway infrastructure node 112, and any communications to or from the infrastructure node 108e can be made using the encryption key supported by the infrastructure node 108e.

When data is received by a particular infrastructure node, the data is typically encrypted using that infrastructure node's encryption key. If the data is ultimately intended for that particular infrastructure node, the data can be decrypted using the infrastructure node's encryption key and then processed and used in any suitable manner. If the data is intended for a different destination, the infrastructure node can decrypt the data using its encryption key and then re-encrypt the data using the encryption key of the next node to receive the data (referred to as the next "hop" in the data's path to a destination). As a result, each data message flowing through an infrastructure node can be protected using the appropriate encryption key for the next hop along the data message's path.

In some embodiments, the encryption key used by an infrastructure node is unique to that infrastructure node or to a subset of the infrastructure nodes. In other words, the same encryption key is not used by all nodes in the wireless network. In particular embodiments, the encryption keys are used by the infrastructure nodes 108a-108e, 112 at the link layer level or at the network layer level.

The leaf nodes 110a-110e can also operate using encryption keys for encrypting and decrypting data sent over the wireless network. For example, in some embodiments, each leaf node operates using a single encryption key and sends encrypted data to multiple infrastructure nodes (such as to two infrastructure nodes). In these embodiments, the encryption key used by the leaf node can be shared between the multiple infrastructure nodes, which act as redundant nodes for the leaf node. Because of this, a transmitted data message from the leaf node may be received by multiple infrastructure nodes. These infrastructure nodes can then forward the data message to their respective next hops, where the data message is protected under the respective keys used by the infrastructure nodes (as described above). The infrastructure nodes may also use the same shared cryptographic key to send data messages to the leaf node. The use of the encryption key in a leaf node could occur at any suitable level, such as at the link layer level in the leaf node.

Among other things, this allows the leaf node to use a single encryption key to communicate with multiple infrastructure nodes, so one encryption key can be used to support redundant communications. Using a single key at the leaf node may help to offset some of the burden of managing multiple encryption keys and associated state data to the infrastructure nodes. This approach may also reduce key storage requirements at the leaf nodes and reduce the amount of processing needed at the leaf nodes (since a leaf node can perform a single cryptographic operation on a data message sent to multiple infrastructure nodes).

Cryptographic keys can be distributed to devices or exchanged between devices in the system 100 in any suitable manner. In particular embodiments, cryptographic keys are distributed and exchanged using data from the server 114 or other component(s) (referred to generally as a "trust authority"). For example, a signed Medium Access Control (MAC) address/public key pair can be used for each node receiving a key. In these embodiments, prior to deployment, each node can register its MAC address and its public key with a trust authority. This could be done over an isolated wired connection to help avoid "man in the middle" or other types of security attacks. The trust authority may sign the MAC address/public key pair and upload the signature (as well as the trust authority's public key) into the node being deployed. After installation, the node being deployed can detect and communicate with at least one other node, such as its neighboring nodes. For each neighboring node, the node being deployed can use the trust authority's digital signature to determine whether the neighboring node has been seen and verified by the trust authority (such as by determining whether the neighboring node has a certificate signed by the trust authority). If so, a pair-wise key exchange can follow between the nodes, allowing the nodes to learn each other's encryption key.

Multicast and broadcast communications can still take place in the system 100 using, for example, a network-wide key distributed by the trust authority over a unique link to each routing node in the network. Also, upon revocation of a node, a new network key can be deployed to the remaining nodes using the unique link as outlined above.

In particular embodiments, data routing in the system 100 can occur by predefining at least two best non-overlapping routes from each source to each destination in the system or wireless network, and data can be sent on these multiple routes at the same time. The destination may receive two or more copies of the same data messages, and useful information can be extracted from the copies. While sending multiple copies of the messages increases the communication bandwidth requirement, it may significantly increase system reliability by making it robust to any single point failure. Unlike homogeneous mesh networks, this approach can operate at a high data-rate (such as up to 54 Mbps) at the infrastructure level and a low data-rate (such as 250 Kbps) at the sensor level, so providing increased bandwidth at the infrastructure level is not a problem. As noted above, redundancy can also be achieved on the sensor level by transmitting data messages from leaf nodes that are received by two or more infrastructure nodes.

Using the cryptographic keys in this manner, significantly improved security can be obtained in a wireless network. Moreover, the processing requirements and other burdens can be removed partially from the leaf nodes and placed on the infrastructure nodes. Further, this approach provides a simple technique for isolating pair-wise communications since communications between a pair of devices can be stopped by revoking the key of at least one of the components (which might not affect a large portion of the wireless network). In addition, using these techniques, a hybrid (wireless and wired) mesh network can be provided for cost-effective, secure, and reliable communications in industrial control systems, where the network has a robust network architecture built on fundamentally strong principles for robust and reliable communications.

Although FIG. 1 illustrates one example of an industrial control and automation system 100, various changes may be made to FIG. 1. For example, the industrial control and automation system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, while described as supporting a wired network and a wireless network, the industrial control and automation system 100 could support any number of wireless or wired networks, at least one of which can use the security mechanisms described above.

Figure 2:
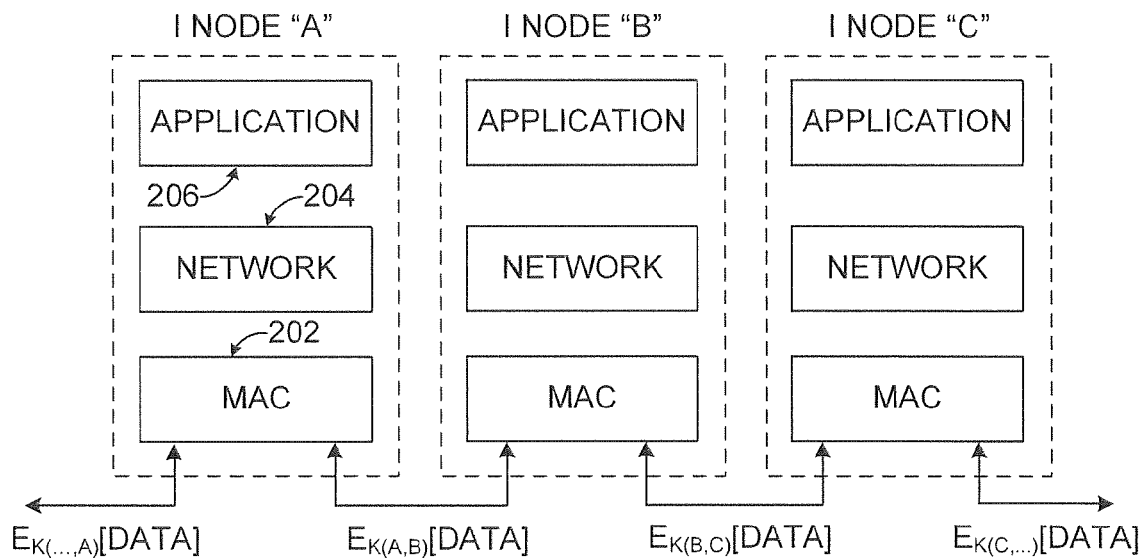
FIGS. 2 through 4 illustrate example techniques for data encryption in an industrial control and automation system according to this disclosure.
Figure 3:
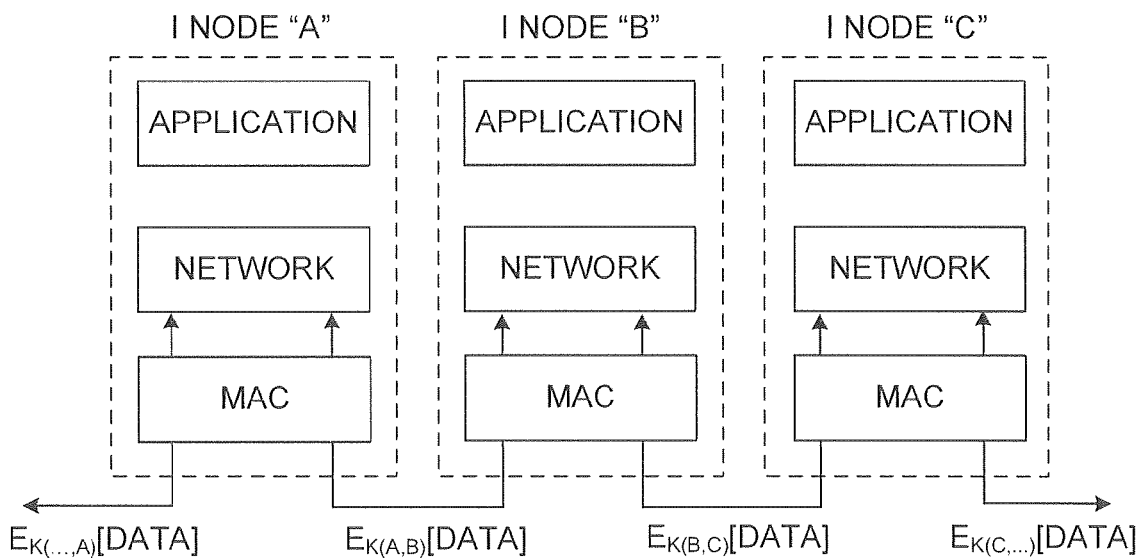
Figure 4:
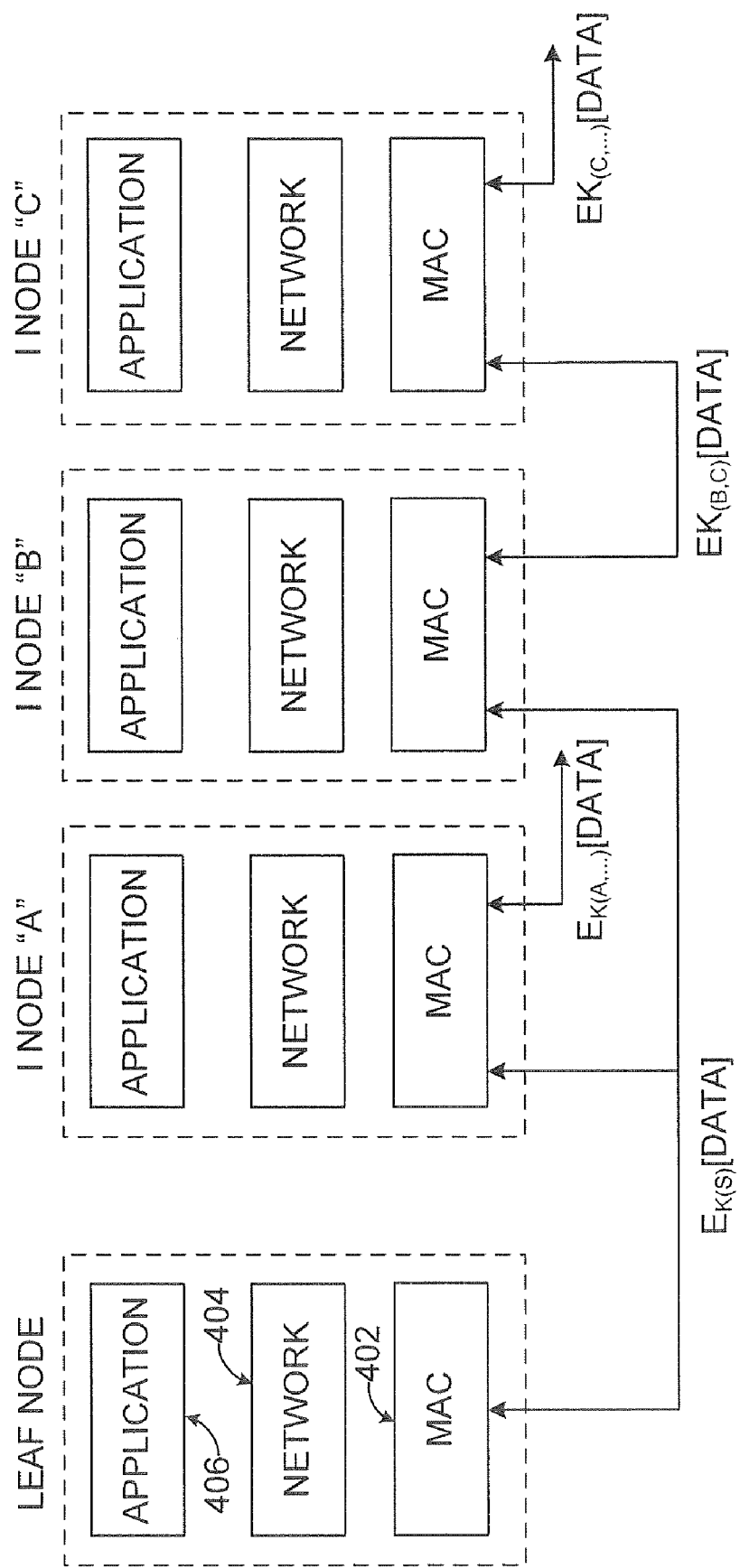

FIGS. 2 through 4 illustrate example techniques for data encryption in an industrial control and automation system according to this disclosure. The data encryption techniques shown in FIGS. 2 through 4 are for illustration only. Other data encryption techniques could be used without departing from the scope of this disclosure.

As shown here, each infrastructure node (gateway or other) may include a MAC layer 202, a network layer 204, and an application layer 206. The MAC layer 202 represents the data link layer of the infrastructure node, which is used to transfer data between network nodes. The MAC layer 202 may also provide techniques for detecting and correcting errors in an underlying physical layer (such as an underlying Ethernet physical layer). The network layer 204 supports the transport of data over a network, such as by routing data to appropriate destinations. The network layer 204 may also perform other functions, such as enforcing quality of service parameters. The application layer 206 generally supports upper level applications executed for users, such as applications for controlling an infrastructure node or providing other higher-level functions. Each of the layers 202-206 can be implemented in any suitable manner, such as by using hardware, software, firmware, or combination thereof.

In FIGS. 2 and 3, data transfers between infrastructure nodes are encrypted using different encryption keys. For example, data transfers between infrastructure nodes "A" and "B" are encrypted using a key known to both nodes "A" and "B" (denoted $E_{K(A, B)}$). Similarly, data transfers between infrastructure nodes "B" and "C" are encrypted using a key known to both nodes "B" and "C" (denoted $E_{K(B,C)}$). Data transfers involving infrastructure node "A" and another node are encrypted using a key known to node "A" (denoted $E_{K(\ldots,A)}$), and data transfers involving infrastructure node "C" and another node are encrypted using a key known to node "C" (denoted $E_{K(C,\ldots)}$). In these figures, an encryption key is denoted as $E_{K(x,y)}$, where x and y represent the infrastructure nodes using that key.

Data encryption and decryption occur at the MAC layer level in FIG. 2 and at the network layer level in FIG. 3. In FIG. 2, data messages being transferred to the next "hop" in a communication path are decrypted and re-encrypted at the MAC layer 202. The data messages may not need to be provided to the network layer 204 in FIG. 2. In FIG. 3, data messages being transferred to the next "hop" in a communication path may not stop at the MAC layer 202 and instead move up to the network layer 204, where the decryption and re-encryption may occur. The exact layer used to perform the encryption and decryption could vary depending on the circumstances. For example, encryption and decryption at the MAC layer 202 could be used as a general rule, and encryption and decryption at the network layer 204 could be used when changes to the underlying MAC protocol cannot be made. Whatever the case, encryption and decryption of data may occur as noted above, where different keys are used to transport data between different infrastructure nodes.

As shown in FIG. 4, the leaf nodes may similarly include a MAC layer 402, a network layer 404, and an application layer 406. These layers may represent the same or similar layers as in the infrastructure nodes. As noted above, a leaf node can communicate with multiple infrastructure nodes using the same encryption key. This shared encryption key is denoted $E_{K(S)}$ and is known and used by two infrastructure nodes in FIG. 4. The infrastructure nodes may continue to communicate amongst themselves using the same technique(s) shown in FIGS. 2 and 3. In particular embodiments, when multiple infrastructure nodes are transmitting the same message to a leaf node, nonce values used for each of the infrastructure nodes may contain the source address of the message originator (in order to avoid leaking information through nonce collision).

Any suitable data could be transferred between leaf and/or infrastructure nodes in this manner. For example, the leaf nodes could include sensors that generate sensor data (such as measurement data). The sensor data, as well as other general data, could be transferred from the leaf nodes to the infrastructure nodes as shown in FIG. 4. The sensor and general data could then be transferred between infrastructure nodes as shown in FIGS. 2 or 3. In particular embodiments, sensor data and general data could be transferred between infrastructure nodes as shown in FIG. 2, and only general data could be transferred between infrastructure nodes as shown in FIG. 3 (although other embodiments could be used).

Although FIGS. 2 through 4 illustrate examples of techniques for data encryption in an industrial control and automation system, various changes may be made to FIGS. 2 through 4. For example, each of the nodes may include any suitable layers in their respective implementations. Also, other types of communications could occur between nodes in the wireless network, and different or common encryption keys could be used for these various communications.

Figure 5:
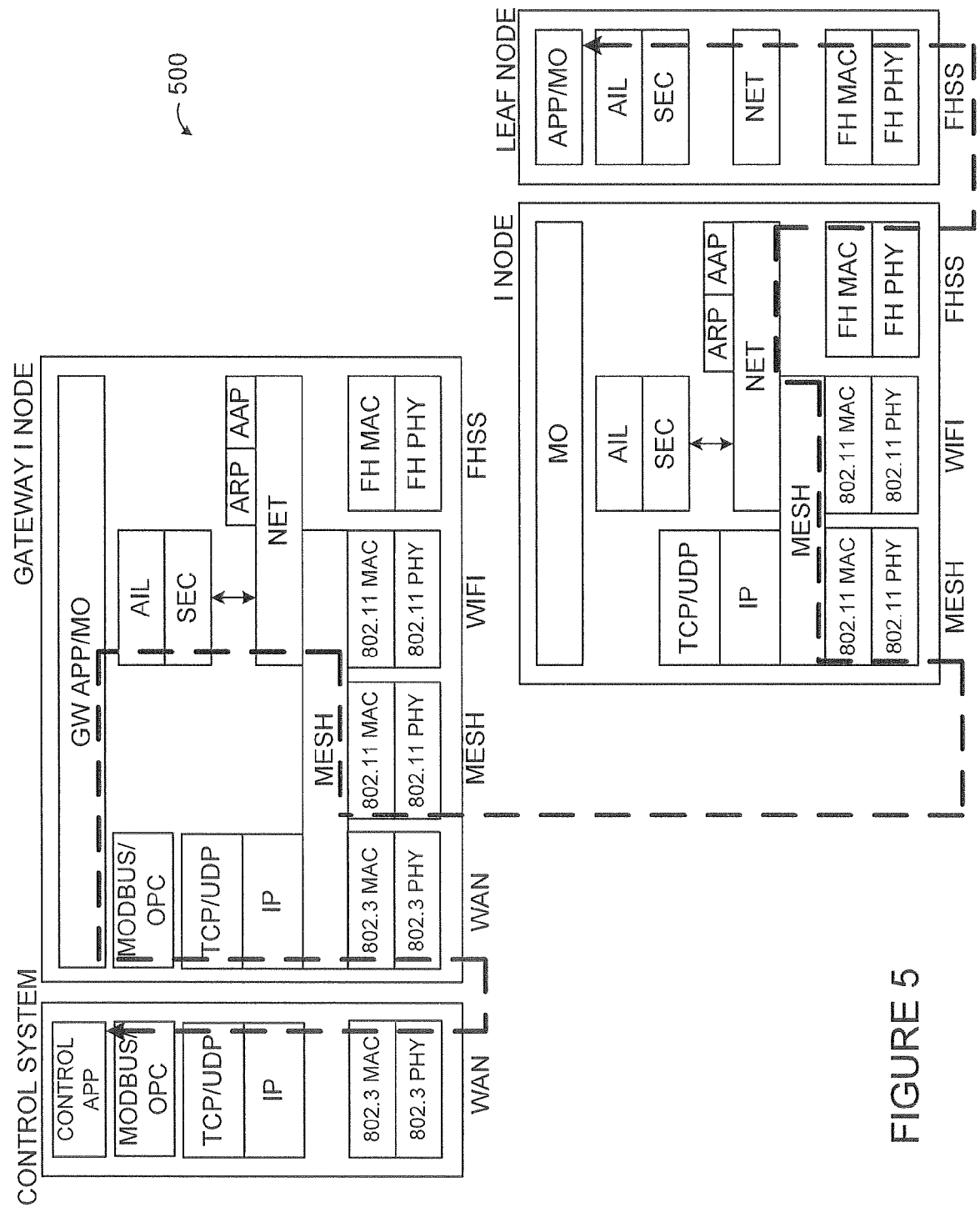
FIG. 5 illustrates an example encrypted data flow between components in an industrial control and automation system according to this disclosure.

FIG. 5 illustrates an example encrypted data flow 500 between components in an industrial control and automation system according to this disclosure. The embodiment of the encrypted data flow 500 shown in FIG. 5 is for illustration only. Other embodiments of the encrypted data flow 500 could be used without departing from the scope of this disclosure.

As shown in FIG. 5, the leaf nodes may include a frequency-hopping spread-spectrum (FHSS) MAC layer (FH MAC) and an FHSS physical layer (FH PHY). These layers support wireless communications between leaf nodes and infrastructure nodes using FHSS techniques. The leaf nodes may also include a network layer (NET), which provides various functions for supporting the creation and use of a wireless network (such as routing, forwarding, and error handling functions). The leaf nodes may further include a security layer (SEC), which supports various security-related functions associated with the wireless network (such as authentication). In addition, the leaf nodes may include an application interface layer (AIL) that provides an interface for applications executed on the leaf nodes at an application and mobile object layer (APP/MO).

The infrastructure nodes may include FHSS MAC and physical layers, which are used to communicate with the leaf nodes. A network layer (NET), security layer (SEC), application interface layer (AIL), and mobile object layer (MO) are also used in the infrastructure nodes. An address resolution protocol layer (ARP) can be used to identify a particular node's hardware address, and an address allocation protocol layer (AAP) can support multicasting of information to multiple nodes. A first 802.11 MAC and physical layer pair can be used for wireless fidelity (WiFi) communications with various wireless devices in the system 100, such as wireless controllers or hand-held user devices. A second 802.11 MAC and physical layer pair can be used for wireless mesh communications with other infrastructure nodes (gateway or other). These communications can be supported by a mesh layer (MESH) in the infrastructure nodes. TCP/UDP and IP layers represent the transport and network layers supporting the wireless mesh network.

The gateway infrastructure nodes may include the same layers as the infrastructure nodes. In this example, the gateway infrastructure nodes also include an 802.3 MAC layer and an 802.3 physical layer, which support communications over a wired network (such as the network 106). The gateway infrastructure nodes also include a Modbus/OPC layer, which supports communications over the wired network with the appropriate protocols.

A control system (such as the controller 104) can use an 802.3 MAC layer and an 802.3 physical layer to communicate with one or more gateway infrastructure nodes. Also, TCP/UDP, IP, and Modbus/OPC layers in the control system support communications with the gateway infrastructure node(s). In addition, a control application layer (CONTROL APP) provides an interface for the control applications executed by the controller 104, such as applications that use data from one or more sensors to generate control signals for one or more actuators.

The dashed lines in FIG. 5 illustrate how data can flow between a leaf node and a control system through one or more infrastructure nodes (gateway or other). As noted above, the leaf node could transmit data to and receive data from multiple infrastructure nodes, each of which can use the same cryptographic key to communicate with the leaf node. Also, communications between different pairs of infrastructure nodes can occur using different cryptographic keys. Decryption of data and subsequent re-encryption of data could occur at any suitable locations, such as in the MAC layers and/or the network layers of the infrastructure nodes.

Although FIG. 5 illustrates one example of an encrypted data flow 500 between components in an industrial control and automation system, various changes may be made to FIG. 5. For example, each device in FIG. 5 could include any other or additional layers depending on its particular implementation. Also, while particular protocols or technologies (such as FHSS, WiFi, 802.11, and 802.3) are noted here, these are for illustration only.

Figure 6:
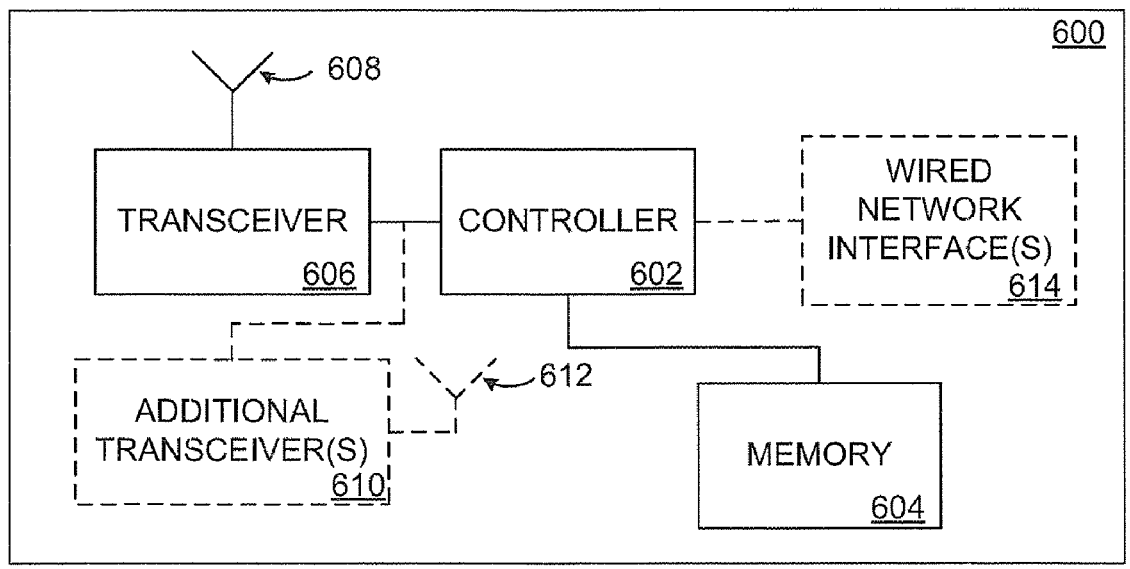
FIG. 6 illustrates an example wireless node in an industrial control and automation system according to this disclosure.

FIG. 6 illustrates an example wireless node 600 in an industrial control and automation system according to this disclosure. The wireless node 600 could, for example, represent a leaf node, infrastructure node, or gateway infrastructure node in the system 100 of FIG. 1 or other system. The embodiment of the wireless node 600 shown in FIG. 6 is for illustration only. Other embodiments of the wireless node 600 could be used without departing from the scope of this disclosure.

As shown in FIG. 6, the device 600 includes a controller 602. The controller 602 controls the overall operation of the device 600. For example, the controller 602 may receive or generate data to be transmitted externally, and the controller 602 could provide the data to one or more other components in the device 600 for transmission over a wired or wireless network. The controller 602 could also receive data over a wired or wireless network and use or pass on the data. As a particular example, the controller 602 in a sensor leaf node could provide sensor data for transmission, and the controller 602 in an actuator leaf node could receive and implement control signals (note that a leaf node could represent a combined sensor-actuator device). As another example, the controller 602 in an infrastructure node could receive data transmitted wirelessly, determine a next hop for the data (if any), and provide the data for transmission to the next hop (if any). As a third example, the controller 602 in a gateway infrastructure node 112 could receive data from a wired network and provide the data for wireless transmission (or vice versa). The controller 602 could perform any other or additional functions to support the operation of the device 600, such as the decryption of received data and the encryption of transmitted data. The controller 602 includes any suitable hardware, software, firmware, or combination thereof for controlling the operation of the device 600. As particular examples, the controller 602 could represent a processor, microprocessor, microcontroller, field programmable gate array (FPGA), or other processing or control device.

A memory 604 is coupled to the controller 602. The memory 604 stores any of a wide variety of information used, collected, or generated by the device 600. For example, the memory 604 could store information received over one network that is to be transmitted over another network. The memory 604 includes any suitable volatile and/or non-volatile storage and retrieval device or devices.

The device 600 also includes a wireless transceiver 606 coupled to an antenna 608. The transceiver 606 and antenna 608 can be used by the device 600 to communicate wirelessly with other devices. For example, in a leaf node, the transceiver 606 and antenna 608 can be used to communicate with infrastructure nodes. In an infrastructure node or gateway infrastructure node, the transceiver 606 and antenna 608 can be used to communicate with leaf nodes. One or more additional transceivers 610 could also be used in the device 600. For instance, in an infrastructure node or gateway infrastructure node, the additional transceiver(s) 610 could be used to communicate with WiFi devices and with other infrastructure nodes or gateway infrastructure nodes. The additional transceivers 610 may be coupled to their own antennas 612 or share one or more common antennas (such as antenna 608). Each transceiver includes any suitable structure for transmitting and/or receiving wireless signals. In some embodiments, each transceiver represents a radio frequency (RF) transceiver, and each antenna represents an RF antenna (although any other suitable wireless signals could be used to communicate). Also, each transceiver could include a transmitter and a separate receiver.

If the device 600 represents a gateway infrastructure node, the device 600 may further include one or more wired network interfaces 614. The wired network interfaces 614 allow the device 600 to communicate over one or more wired networks, such as the network 106. Each wired network interface 614 includes any suitable structure for transmitting and/or receiving signals over a wired network, such as an Ethernet interface.

Although FIG. 6 illustrates one example of a wireless node 600 in an industrial control and automation system, various changes may be made to FIG. 6. For example, various components in FIG. 6 could be combined, subdivided, or omitted and additional components could be added according to particular needs. Also, in general, a "wireless node" may represent any device that can transmit and/or receive data wirelessly (even if the "wireless node" has the ability to transmit and/or receive data over a wired connection, as well).

Figure 8:
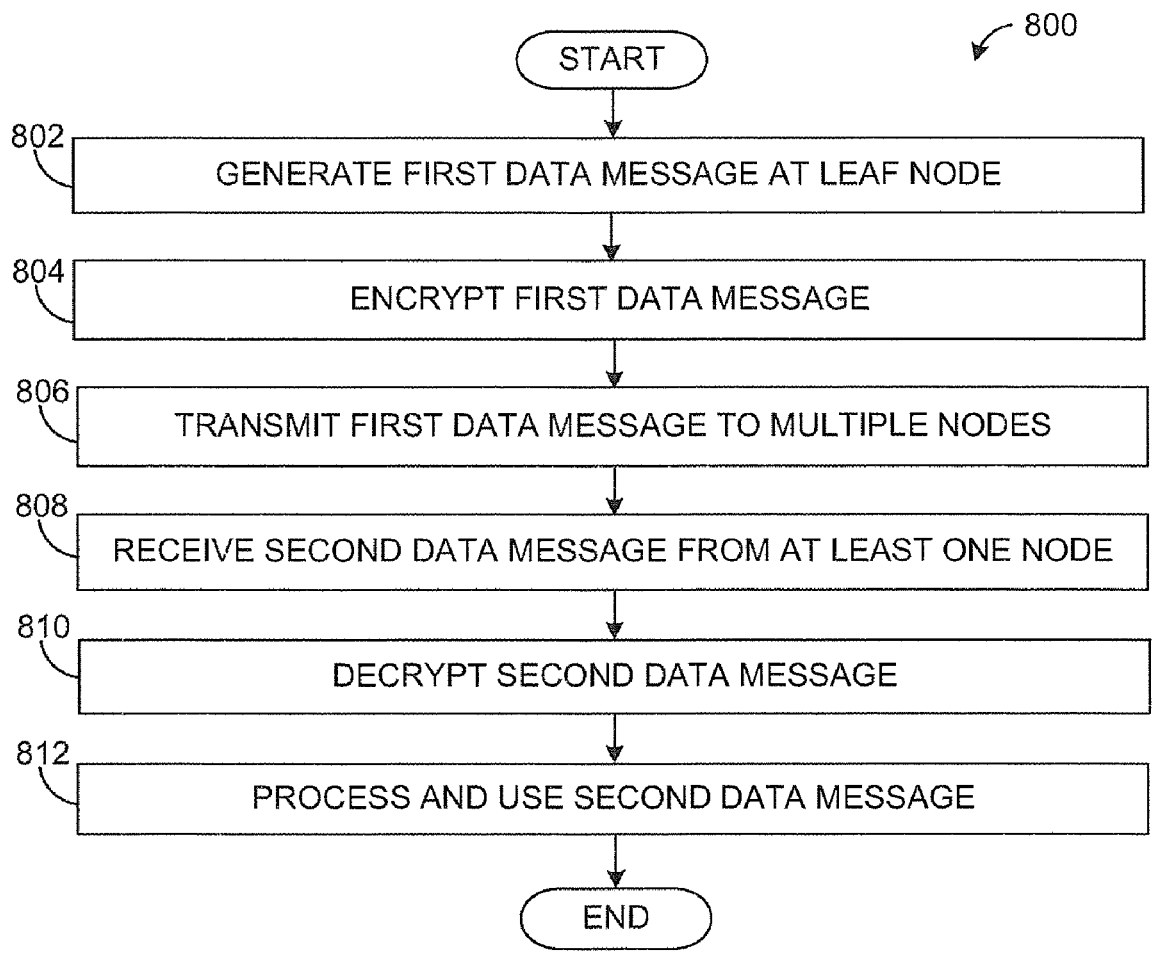
FIGS. 7 and 8 illustrate example methods for providing security in a wireless network according to this disclosure.
Figure 7:
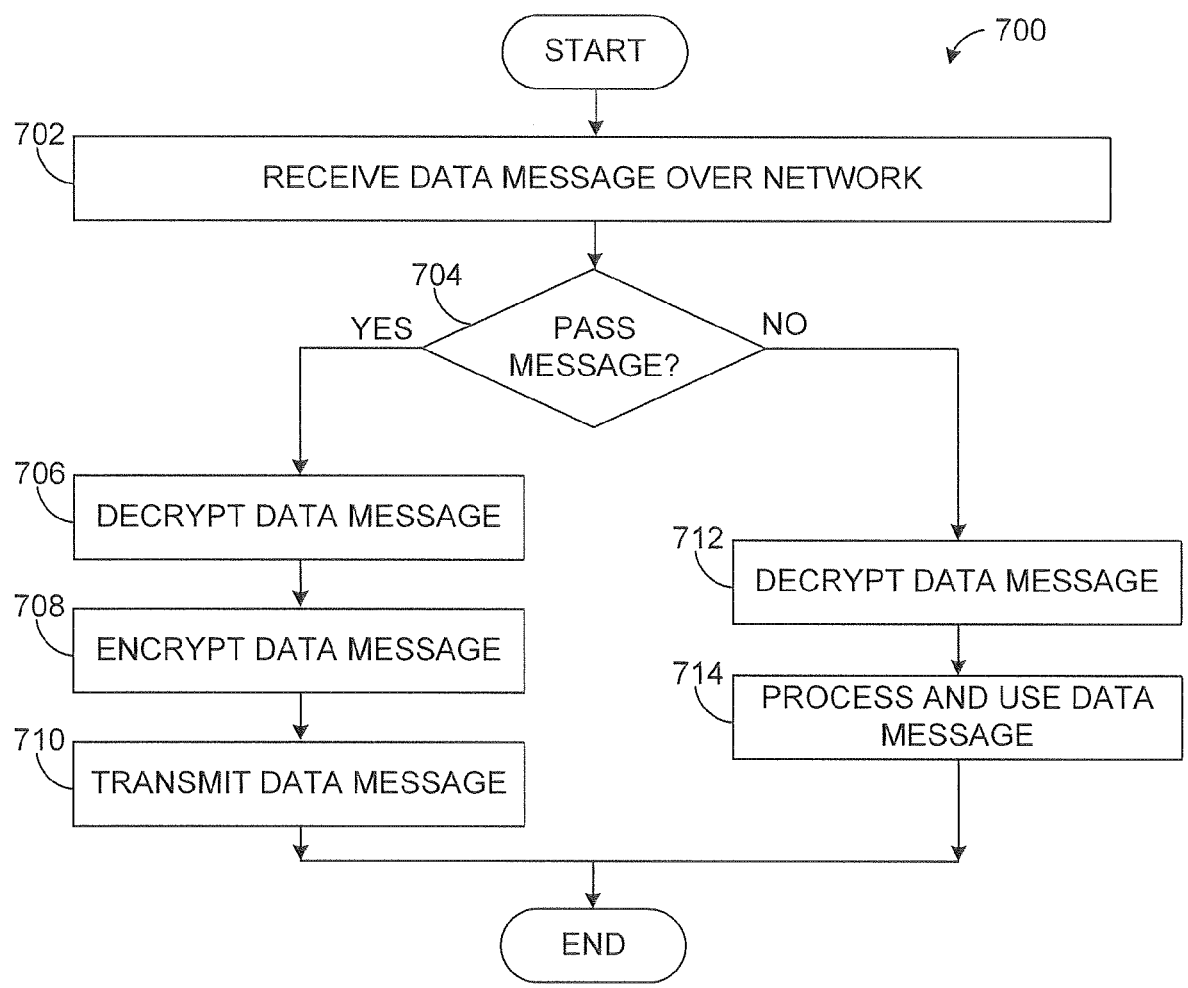

FIGS. 7 and 8 illustrate example methods for providing security in a wireless network according to this disclosure. The embodiments of the methods shown in FIGS. 7 and 8 are for illustration only. Other embodiments of the methods could be used without departing from the scope of this disclosure.

As shown in FIG. 7, a method 700 includes receiving a data message over a network at step 702. This may include, for example, an infrastructure node 108a-108e receiving the data message over a wireless connection. This may also include a gateway infrastructure node 112 receiving the data message over a wired or wireless connection. The message could come from any suitable source, such as another infrastructure node or gateway infrastructure node or from a leaf node. The data message may be encrypted using an encryption key known to the receiving device.

A determination is made as to whether the data message is to be passed along to a next hop in a communication route at step 704. This may include, for example, the infrastructure node or gateway infrastructure node examining the data message to determine if the message is destined for that node and/or for any other destinations.

If the data message is to be passed along, the data message is decrypted at step 706 and encrypted at step 708. This may include, for example, decrypting the data message using a first encryption key known to the infrastructure node or gateway infrastructure node. The first encryption key could, for instance, be used only by that infrastructure node or gateway infrastructure node and a neighboring node. This may also include encrypting the data message using a second encryption key known to the infrastructure node or gateway infrastructure node. The second encryption key could, for instance, be used only by that infrastructure node or gateway infrastructure node and by the next node along the communication route. The re-encrypted message is then communicated at step 710.

If the data message is not to be passed along, the data message is decrypted at step 712 and then processed and used at step 714. This may include, for example, decrypting the data message using an encryption key known to the infrastructure node or gateway infrastructure node. Also, the message could be processed and used in any suitable manner, such as by examining the message contents, taking any specified actions, or providing any requested data.

It may be noted that while the method 700 includes "yes" and "no" branches from step 704, both branches could apply in certain situations. For example, a broadcast or multicast message could be intended for the infrastructure node or gateway infrastructure node and for other nodes. In these cases, the functions in both branches could occur (although only a single decryption operation may be necessary).

As shown in FIG. 8, a method 800 includes generating a first data message at a leaf node at step 802. This may include, for example, the leaf node generating a data message containing sensor or actuator data. The data message is encrypted at step 804 and transmitted to multiple wireless nodes at step 806. This may include, for example, encrypting the data message using an encryption key known to the leaf node and to two or more infrastructure nodes (gateway or other). The data message can be encrypted once, and the encrypted data message can then be broadcast or otherwise communicated to multiple infrastructure nodes.

A second data message is received at the leaf node at step 808. This may include, for example, the leaf node receiving the data message from one or multiple infrastructure nodes. The data message is decrypted at step 810 and processed and used at step 812. This may include, for example, decrypting the data message using the encryption key known to the leaf node and the two or more infrastructure nodes. Also, the second data message could be processed and used in any suitable manner, such as by examining the message contents, taking any specified actions, or providing any requested data.

Although FIGS. 7 and 8 illustrate examples of methods for providing security in a wireless network, various changes may be made to FIGS. 7 and 8. For example, while shown as a series of steps in each figure, various steps in FIGS. 7 and 8 could overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

it may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving at a first wireless routing node a digital signature from a trust authority, wherein the digital signature is generated using a Medium Access Control (MAC) address/public key pair, and wherein the digital signature is received from the trust authority via an isolated connection prior to the first wireless routing node joining a wireless network;
   verifying at the first wireless routing node whether a digital certificate provided by a second wireless routing node in the wireless network is signed using the digital signature associated with the trust authority;
   based upon the verification, exchanging encryption keys with the second wireless routing node, the exchanged encryption keys including a first encryption key;
   receiving first data at the first wireless routing node from the second wireless routing node, wherein the first data is encrypted and is associated with an industrial control and automation system;
   decrypting the received first data using the first encryption key to produce first decrypted data, the first encryption key uniquely associated with communications between the first and second wireless routing nodes;
   encrypting the first decrypted data using a second encryption key to produce first encrypted data, the second encryption key uniquely associated with communications between the first wireless routing node and a third wireless routing node in the wireless network, the second encryption key being exchanged after the third wireless routing node has been verified by the first wireless routing node using the digital signature of the trust authority; and
   communicating the first encrypted data to the third wireless routing node.

2. The method of claim 1, further comprising:
   exchanging encryption keys at the first wireless routing node with any wireless node having (i) an active link with the first wireless routing node and (ii) a certificate signed by the trust authority.

3. The method of claim 1, wherein decrypting the received first data and encrypting the first decrypted data are performed at one or more of: a MAC layer and a network layer in the first wireless routing node.

4. The method of claim 1, wherein the first wireless routing node and the third wireless routing node use a same encryption key to communicate with one or more leaf nodes in the wireless network.

5. The method of claim 1, further comprising receiving second data at the first wireless routing node, wherein the second data is associated with at least one of: a sensor and an actuator in the industrial control and automation system.

6. A wireless routing node comprising:
   at least one transceiver configured to communicate over a wireless network; and
   at least one controller configured to:
      receive a digital signature of a trust authority via an isolated connection prior to joining the wireless network, wherein the digital signature is associated with a Medium Access Control (MAC) address/public key pair;
      verify whether a digital certificate provided by a second wireless routing node in the wireless network is signed using the digital signature associated with the trust authority;
      exchange encryption keys with the second wireless routing node based upon the verification, the exchanged encryption keys including a first encryption key;
      receive first data from the second wireless routing node, wherein the first data is encrypted and is associated with an industrial control and automation system;
      decrypt the first data using the first encryption key to produce first decrypted data, the first encryption key uniquely associated with communications between the wireless routing node and the second wireless routing node;
      receive a second encryption key from a third wireless routing node in the wireless network after verifying the third wireless routing node using the digital signature of the trust authority;
      encrypt the first decrypted data using the second encryption key to produce first encrypted data, the second encryption key uniquely associated with communications between the wireless routing node and the third wireless routing node; and
      provide the first encrypted data to the at least one transceiver for communication to the third wireless routing node.

7. The wireless routing node of claim 6, wherein the at least one controller is configured to exchange encryption keys at the wireless routing node with any other wireless node having (i) an active link with the wireless routing node and (ii) a certificate signed by the trust authority.

8. The wireless routing node of claim 6, wherein the at least one controller is configured to decrypt the received first data and encrypt the first decrypted data at one or more of: a MAC layer and a network layer in the wireless routing node.

9. The wireless routing node of claim 6, wherein the wireless routing node and the third wireless routing node are configured to use a same encryption key to communicate with one or more leaf nodes in the wireless network.

10. The wireless routing node of claim 6, wherein the at least one controller is further configured to receive second data via the at least one transceiver, the second data associated with at least one of: a sensor and an actuator in the industrial control and automation system.

11. A method comprising:
   receiving at a first wireless node a digital signature from a trust authority, wherein the digital signature is received prior to the first wireless node joining a wireless network via an isolated connection, and wherein the first wireless node is a leaf node;

verifying the first encryption key by the first wireless node using the digital signature of the trust authority;

generating first data at the first wireless node, the data associated with an industrial control and automation system;

encrypting the first data using a first encryption key; and transmitting the first data to multiple second wireless nodes in the wireless network, wherein the second wireless nodes are infrastructure nodes and are capable of using the same first encryption key to decrypt the first data.

12. The method of claim 11, further comprising:

decrypting the first data at each of the second wireless nodes using the first encryption key to produce decrypted data;

encrypting the decrypted data at each of the second wireless nodes, each second wireless node using a different second encryption key to produce encrypted data; and communicating the encrypted data at each of the second wireless nodes.

13. The method of claim 11, further comprising:

receiving second data at the first wireless node from at least one of the second wireless nodes; and decrypting the second data using the encryption key.

14. The method of claim 11, wherein encrypting the first data using the first encryption key comprises performing a single cryptographic operation to encrypt the first data for communication to the multiple second wireless nodes.

15. The method of claim 11, wherein verifying the first encryption key by the first wireless node using the digital signature of the trust authority comprises:

verifying, at the first wireless node, whether a digital certificate provided by one of the second wireless nodes is signed using the digital signature associated with the trust authority; and exchanging encryption keys with one of the second wireless nodes based on the verification, the exchanged encryption keys including the first encryption key.

16. The method of claim 15, further comprising:

exchanging encryption keys at the first wireless node with any wireless node having (i) an active link with the first wireless node and (ii) a certificate signed by the trust authority.

17. The method of claim 11, wherein encrypting the first data is performed at one or more of: a Medium Access Control (MAC) layer and a network layer in the first wireless node.

18. The method of claim 11, wherein the first wireless node is at least one of: a sensor and an actuator in the industrial control and automation system.

19. The method of claim 1, wherein a MAC address of the first wireless routing node and a MAC address of the third wireless routing node are registered with the trust authority.

20. The method of claim 19, further comprising:

verifying that the MAC address of the third wireless routing node has been registered with the trust authority; and exchanging encryption keys between the first and third wireless routing nodes, the encryption keys including the second encryption key uniquely associated with communications between the first and third wireless routing nodes.

21. The method of claim 1, wherein receiving at the first wireless routing node the digital signature of the trust authority comprises:

registering a MAC address of the first wireless routing node with the trust authority and receiving the digital signature of the trust authority over the isolated connection prior to the first wireless routing node joining the wireless network;

wherein a MAC address of the third wireless routing node is also registered with the trust authority.

* * * * *

UNITED STATES PATENT AND TRADEMARK OFFICE
CERTIFICATE OF CORRECTION

PATENT NO.         : 8,280,057 B2
APPLICATION NO.    : 12/020180
DATED              : October 2, 2012
INVENTOR(S)        : Ramakrishna S. Budampati et al.

It is certified that error appears in the above-identified patent and that said Letters Patent is hereby corrected as shown below:

Please insert as the first Paragraph of the Application:

--GOVERNMENT LICENSE RIGHTS

This invention was made with government support under DE-AC04-94AL85000 awarded by the U.S. Department of Energy. The government has certain rights in the invention.--

Signed and Sealed this
Nineteenth Day of February, 2013

Teresa Stanek Rea
*Acting Director of the United States Patent and Trademark Office*